United States Patent [19]

Sulzer

[11] 4,314,473
[45] Feb. 9, 1982

[54] METHOD AND APPARATUS FOR TESTING SNUBBERS IN SITU

[75] Inventor: Harry E. Sulzer, Telford, Pa.

[73] Assignee: Anchor/Darling Industries, Inc., Bala Cynwyd, Pa.

[21] Appl. No.: 84,985

[22] Filed: Oct. 15, 1979

[51] Int. Cl.³ .................................. G01M 19/00
[52] U.S. Cl. ......................................... 73/11
[58] Field of Search ............... 73/11; 188/1 A, 1 B, 188/297, 321

[56] References Cited

U.S. PATENT DOCUMENTS

| | | | |
|---|---|---|---|
| 1,203,580 | 11/1916 | Carter | 188/321 X |
| 3,944,029 | 3/1976 | Jozuka | 188/297 |
| 4,192,173 | 3/1980 | Ay et al. | 73/11 |

Primary Examiner—James J. Gill
Attorney, Agent, or Firm—Dann, Dorfman, Herrell & Skillman

[57] ABSTRACT

A method and apparatus for testing seismic shock absorbing snubbers in situ. Such snubbers are used in power plants in association with piping that is yieldably attached by way of pipe hangers or supports to the plant building structure. Typically, snubbers are operatively connected between the pipe and the building or other support structure. Such snubbers permit free motion of the pipe in response to slow thermal expansion or contraction of the pipe, but resist or damp rapid motion of the pipe induced by seismic shock or vibration. In a method aspect of the invention, the snubber system permits testing in situ by loosening, but not disconnecting, a connection between the snubber and the pipe (or, alternatively, between the snubber and the support structure) to permit limited motion between two relatively movable sections of the snubber, without inducing movement of the adjacent pipe; then applying a test force between the relatively movable sections of the snubber to cause relative movement therebetween to determine the operation of the snubber.

13 Claims, 4 Drawing Figures

METHOD AND APPARATUS FOR TESTING SNUBBERS IN SITU

BACKGROUND OF THE INVENTION

Shock absorbing or damping snubbers are widely used in electric power plants, particularly plants employing nuclear energy, in which pipes are yieldably attached, by way of pipe hangers or supports, to plant structure. In such applications, the snubbers are operatively connected, usually as part of a strut assembly, between the pipe and structure. The snubber's function is to permit free motion or movement of the pipe relative to the structure in response to slow thermal expansion or contraction of the pipe, but to resist or damp rapid relative motion of the pipe, such as might be induced by seismic shock or vibration.

While the life of a high quality snubber should be of the order of several decades, their function is so important to the safe operation of the electrical generating plants that present practice requires that such snubbers be subjected to periodic test to ensure that they will operate properly. Accordingly, the practice in the industry is to have technicians, who may have to be protected from the radiation encountered in the area, to remove the snubber, or the snubber and strut assembly, bodily from the system. Then the snubber is decontaminated to ensure that radiation therefrom, induced by the environment from which it was taken, is reduced to a level low enough to permit handling by others. Thereafter, the snubber is transported to a test location for examination and test by test personnel. Following test, if the snubber is determined to operate within a desired specification, the snubber is replaced in the system. If the snubber is not performing properly, it must be replaced, or repaired prior to reinstallation.

With large snubbers and snubber and strut assemblies weighing hundreds of pounds, and with some plants employing hundreds of snubbers, it is evident that such test procedures are highly cumbersome, time-consuming, and expensive to perform. It has been estimated that for each one million dollars invested in snubbers, a nucelar power plant may spend, over the life of the snubbers, three times that amount or more in performing the required periodic tests in addition to the cost of repairs.

The above-enumerated problems involved in current snubber test practices are overcome, according to the present invention, by providing an improved snubber that lends itself to in situ test procedures and, further, by providing a method and apparatus for testing such snubbers in their normal, operational location in the snubber system. The test may be performed reliably, quickly, safely and inexpensively.

SUMMARY OF THE INVENTION

The present invention is directed to an improved snubber that is adapted to in situ testing. The invention is further directed to a novel snubber accessory or coupling that can be used to adapt a conventional snubber to in situ testing. The invention also comprehends the method and apparatus for testing snubbers in situ.

According to the method aspect of the invention, the snubber system includes a supporting structure such as a ceiling or wall, a structure such as piping supported by the supporting structure, and a snubber having relatively movable sections and being operatively coupled between the supporting structure and the supported structure. In this arrangement, the method comprises loosening the coupling, but not disconnecting it, between the snubber and one of the structures to permit limited movement between the relatively movable sections of the snubber, without inducing consequential motion of the adjacent pipe. The technician then applies a test force between the relatively movable sections of the snubber sufficient to cause relative motion therebetween. Various test forces may be applied to enable the technician to observe the operation of the snubber under a variety of conditions.

In an apparatus aspect of the invention, a mode selection means or two mode coupling is interposed between one section of the snubber and its terminal means or end. This mode selection coupling provides, selectively, a fixed, tight coupling for normal snubber operation or, alternatively, a sliding coupling that permits limited, relative, free sliding movement between the snubber section and its associated terminal end. With the coupling adjusted in the latter mode, a test fixture may be employed between the two sections of the snubber and, through the agency of the test fixture and a torque wrench, a test force is applied between the two relatively movable sections of the snubber to cause relative movement therebetween for testing snubber operation without causing corresponding or substantial movement of the supported structure or piping. In one test procedure contemplated by this invention, the applied force is proportional to the force rating of the snubber. The technician then observes the time required to effect a predetermined displacement between the snubber sections. By reference to a chart or a table of snubber characteristics, the technician can determine if the response of the snubber falls within the specifications established for the unit.

Following such test, the mode selection coupling is returned to its original fixed condition or operative relationship for normal snubber functioning or operation in the snubber system. Accordingly, it is a principal object of the invention to provide an improved method and apparatus for testing snubbers, which permits reliable testing of each snubber in situ, i.e., in its normal, operational location in the snubber system.

A further object of the invention is to provide an improved snubber that, unlike those presently known in the snubber art, is adapted to be tested, in situ, without disturbance to the structures to which the snubber is attached.

A still further object of the invention is to provide an in situ snubber test procedure that will greatly reduce the cost of testing snubbers and substantially reduce the time involved in testing snubbers.

DETAILED DESCRIPTION OF THE INVENTION

Figure 1:
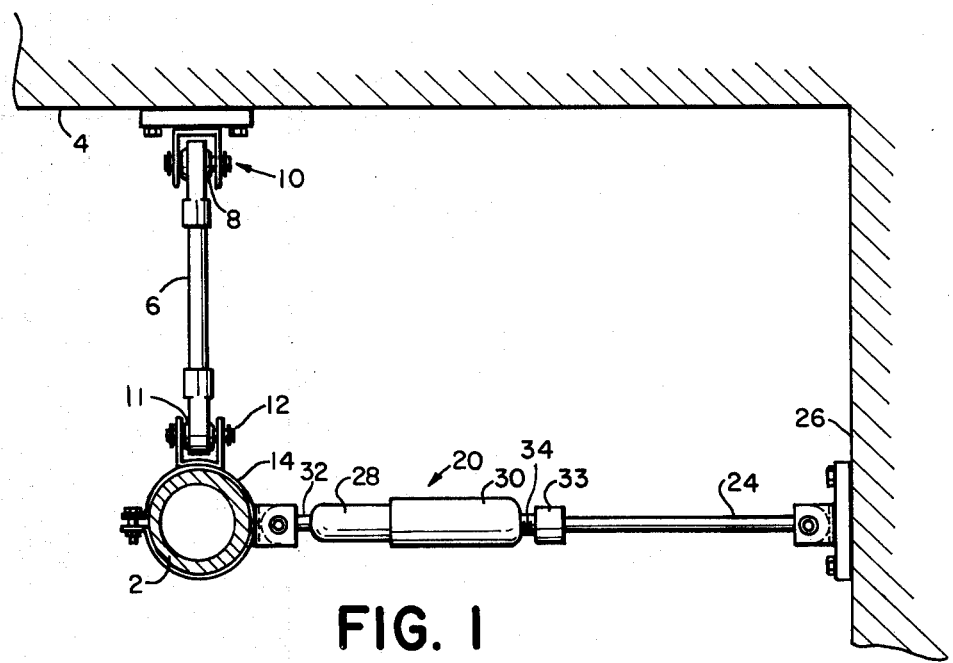
FIG. 1 is an explanatory diagram showing, in elevation, a typical snubber system in which a high pressure steam pipe, supported from a plant ceiling by a pipe hanger, is protected from the effects of seismic shock by a horizontally disposed strut and snubber combination.

Referring to FIG. 1, an explanatory diagram showing a snubber system is depicted. More specifically, FIG. 1 illustrates, in a diagrammatic manner, how a steam pipe, generally designated 2, may be positioned in the environment of a power plant by means of hangers, struts and snubbers. Thus, steam pipe 2 may be supported from the ceiling 4 of the plant structure by means of a suitable pipe hanger 6. Pipe hanger 6 may be attached to ceiling 4 by conventional means which may include ball bushing 8 and a pin and clevis assembly generally designated 10. A similar ball bushing 11 and pin and clevis assembly 12 may be used to attach hanger 6 to pipe strap 14. While the pipe hanger 6 supports the full weight of the pipe and its accessories, the presence of spherical bearings 8 and 11 and assemblies 10 and 12 result in the pipe being yieldably supported by the ceiling, allowing for such motion or movement of the pipe as may result from thermal expansion and contraction. If desired, pipe hanger 6 may also incorporate a shock absorbing spring means (not shown) for absorbing shocks in the direction of the hanger axis.

To damp excessive motion of the pipe, such as may be caused by water hammer, seismic shock and seismic vibration, it is customary to provide certain lateral support for the pipe. Typically, such support is provided by a snubber generally designated 20 which may be coupled directly to pipe strap 14, and by strut 24 to plant wall structure 26. In practice, the strut 24 may be longer, relative to snubber 20, than is suggested by the explanatory diagram. In close-coupled systems, where wall 26 is closer to pipe 2, it may be possible to dispense with strut 24, snubber 20 then constituting the sole element between pipe 2 and wall 26. In any event, the snubber connection to pipe strap 14, as well as the connection between strut 24 (or snubber 20) and the wall-mounted clevis, ordinarily employ suitable self-aligning ball bushings to afford freedom of angular motion at the bushings to accommodate anticipated motion of the pipe relative to the wall and ceiling supports.

The snubber 20 typically comprises two relatively movable parts or sections 28 and 30, and terminal means 32 and 34, respectively, by means of which the snubber may be coupled to the clevis secured to pipe 2 and to strut 24, for example. Typically, the parts or sections 28 and 30 of the snubber move axially relative to each other and usually the snubber sections are telescopically related. In accordance with the present invention, there may be interposed between snubber section 30 and strut 24 a mode selection or coupling means 33 that provides, selectively, and in the direction of the axis of the snubber and strut assembly, either a fixed tight, or a loose freely-sliding, coupling between parts 30 and 24. Although the mode selection or coupling means 33, as shown in FIG. 1, is interposed proximate the snubber terminal means 34, it should be understood that the coupling means 33 may be disposed at any suitable location along strut 24. If the snubber 20 is employed with a strut (not shown) interposed between the pipe strap 14 and the snubber terminal means 32, the coupling means 33 may be employed at any suitable position along such strut. The mode selection feature, will be described in detail with reference to FIGS. 2 and 3.

Figure 2:
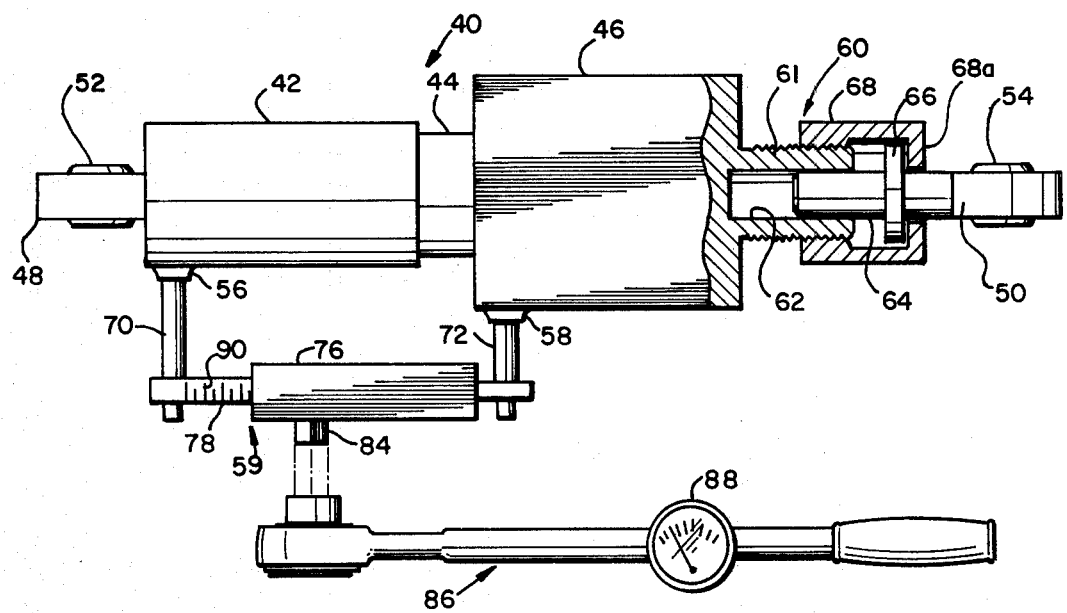
FIG. 2 is an enlarged plan view, partly broken away, of a conventional snubber provided with the mode selection coupling of the present invention. Also shown is a test instrument attached to the two sections of the snubber, together with a torque wrench to actuate the test instrument.

Reference is now made to FIG. 2, which illustrates, by way of example, a snubber that is adapted to be tested in accordance with the in situ test feature of the present invention. The snubber generally designated 40 is shown as a two section, telescoping form having a first tubular section 42 and a second tubular section which comprises a small diameter cylindrical portion 44 fixed to a larger diameter cylindrical portion 46. During normal operation of the snubber, cylindrical portion 44 of snubber section 44, 46 slides telescopically into and out of cylindrical section 42. To afford means for coupling the snubber 40 into a short-coupled snubber system, the snubber at section 42 may be provided at one end thereof with an end cap or terminal 48 and at the other end thereof with an end cap or terminal 50. In such arrangement, these end terminals are provided with self aligning ball bushings 52 and 54 to provide ease of assembly when the snubber is attached to its associated hardware, as described with reference to FIG. 1. In systems where a fixed strut (e.g., strut 24' FIG. 1) is employed in association with snubber 40, the strut may be welded or otherwise secured directly to snubber terminal 50, in place of ball bushing 54.

In accordance with one embodiment of the present invention, section 42 of snubber 40 may be provided with a suitable boss or engaging means 56, and section 44, 46 of the snubber may be provided with a similar boss or engaging means 58, to which a test fixture generally designated 59, to be described hereinafter, may be attached. Further, in accordance with the invention, one of the end terminals 48 or 50, is fixedly secured to its associated snubber section, while the other end terminal is secured or coupled by the mode selection or coupling means, which provides selectively, either a fixed, tight coupling or, alternatively, a smoothly sliding loose coupling, that permits limited freely sliding motion between the snubber section and its associated end terminal. In the embodiment of FIG. 2, end terminal 48 is securely fixed to snubber section 42, while end terminal 50 is provided with the above-mentioned mode selection coupling generally designated 60. In the arrangement illustrated for the mode selection coupling, part 46 of snubber section 44, 46 is provided with a threaded extension 61 having a cylindrical recess or bore 62 adapted slidably to receive cylindrical member or stud 64 which is fixed to end terminal means or end 50. Stud 64 is provided with an integral increased diameter portion or flange 66 adjacent the portion received in the bore 62. A threaded jam nut 68 threadedly engages threaded extension 61 and extends to encircle and capture the stud 64, by reduced diameter end 68a. Jam nut 68 serves to hold end terminal 50 in selective engagement, loose or tight, with section 44, 46 of snubber 40 depending on the selected coupling of the jam nut.

In normal operation of the snubber in the system, jam nut 68 is screwed securely onto threaded extension 61 of the snubber, so that flange 66 of cylindrical stud 64 is fixedly held against threaded extension 61 by the stud-retaining shoulder or end 68a of jam nut 68. This constitutes one of the two modes permitted by the mode selective coupling means 60.

When it is desired to test snubber 40, in accordance with the practice of this invention, jam nut 68 is loosened sufficiently to permit a predetermined amount of telescoping motion or movement between threaded extension 61 and cylindrical stud 64. This is the other or second mode of the mode selection coupling, for testing snubber operation. That portion of cylindrical stud 64 engaging cylindrical recess 62 is preferably long enough to ensure freely telescoping movement of the parts without cocking. Free motion of the order of one-half inch is generally sufficient to permit meaningful test of the snubber, in situ. Thus, the combination of jam nut 68, flanged stud 64, and threaded extension 61 constitutes a mode selection means or coupling, interposed between one section 46 of snubber 40 and its terminal 50, for providing, selectively, either a fixed, in-service securement between snubber section 46 and its terminal 50 or, alternatively, a loose, in-test securement that affords limited movement between snubber section 46 and its terminal 50 in the direction of the axis of the snubber. In the performance of the test procedure envisioned by the present invention, test fixture 59 is secured to the two sections 42 and 44, 46 of the snubber by means of suitable test fixture adapters 70 and 72, respectively, which are secured to the sections of the snubber by way of previously-described bosses 56 and 58, and to test fixture 59 by any suitable means.

While the test fixture may comprise any suitable means for applying axial forces, positive and negative, to the two sections of the snubber, so as to cause relative axial movements thereof, the fixture may conveniently comprise a body portion 76 which includes, as will be described in detail with reference to FIG. 4, a pinion (not visible in FIG. 2) which may be rotated on its axis by means of operating stud 84, and a rack member 78 (operatively engaged with the pinion), which slides into and out of body portion 76 in response to rotation of stud 84. The visible part of rack 78, that part of the rack which extends out of body portion 76 of the test fixture, may be provided with gage marks 90. Such gage marks may be useful in indicating the amount of relative axial movement of the snubber sections where the snubber itself is not provided with gage marks.

While various test procedures may be employed, a typical test may be performed by loosening jam nut 68 to provide the freedom of axial motion or movement heretofore described, applying a conventional torque wrench generally designated 86 to stud 84 of the test fixture, slowly moving the sections of the snubber back and forth, within the limits allowed by the freedom of motion afforded by the aforesaid loosening of the jam nut 68, to confirm that slow movement of the snubber sections is freely afforded, when a predetermined low range of force is applied. Then the technician may apply a sudden, predetermined high range of force to the snubber by way of the torque wrench. The desired force within the range of force can be achieved by observing the readings displayed on the calibrated force gage 88. Typically, the force applied to the snubber sections, by way of the test fixture, will be a force related to the force rating F, of the snubber. Suitable test forces would be the force F itself, $\frac{3}{4}$ F, $\frac{1}{2}$ F, $\frac{1}{4}$ F, or the like. Such predetermined force or forces may be applied for a period long enough to effect a predetermined relative movement of the snubber sections as indicated by gage marks 90 on rack 78, or by gage marks provided on the snubber itself. Alternatively, such predetermined relative movement of the snubber sections can be determined by movement limiting means associated with the test fixture itself, as will be described with reference to the device illustrated in FIG. 4.

The technician, or his associate, then observes the time required to effect the predetermined displacement between snubber sections. By reference to a chart or table of snubber test characteristics, the technician can determine if the response of the snubber falls within the specifications established for the unit under test. Preferably, all tests are made with both positive and negative applied forces, i.e., with forces that result in both contraction and extension of the snubber, to ensure that the damping effect of the snubber is independent of the direction of the applied forces. Following such tests, the mode selection coupling is returned to its original tight or fixed condition by tightening jam nut 68, as previously described. Test fixture 59 may then be removed from the snubber adapters 70 and 72.

In some instances, it may not be necessary to subject a snubber to the rigorous test procedures described above. This is particularly true when the snubber employs neither hydraulic systems nor friction braking elements, the effectiveness of which may vary with age, temperature, radiation and severity of use or service. Thus, in snubbers that are entirely mechanical and employ no friction braking elements, such as those described in my copending application Ser. No. 10,621, filed Feb. 9, 1979, it may often be sufficient to test the snubber's freedom of motion or movement, in both extension and retraction, in response only to very slowly applied or low force ranges or levels. If the technician wishes to test snubber operation beyond the last-mentioned test and is thoroughly familiar with the normal characteristics of the snubber under test, he may assure himself that the snubber is capable of performing properly under shock conditions by simply applying, by way of a standard socket wrench, a number of sharply applied, briefly sustained, sudden forces, without regard to the precise torque he applies and without reference to tables of snubber characteristics.

Figure 3:
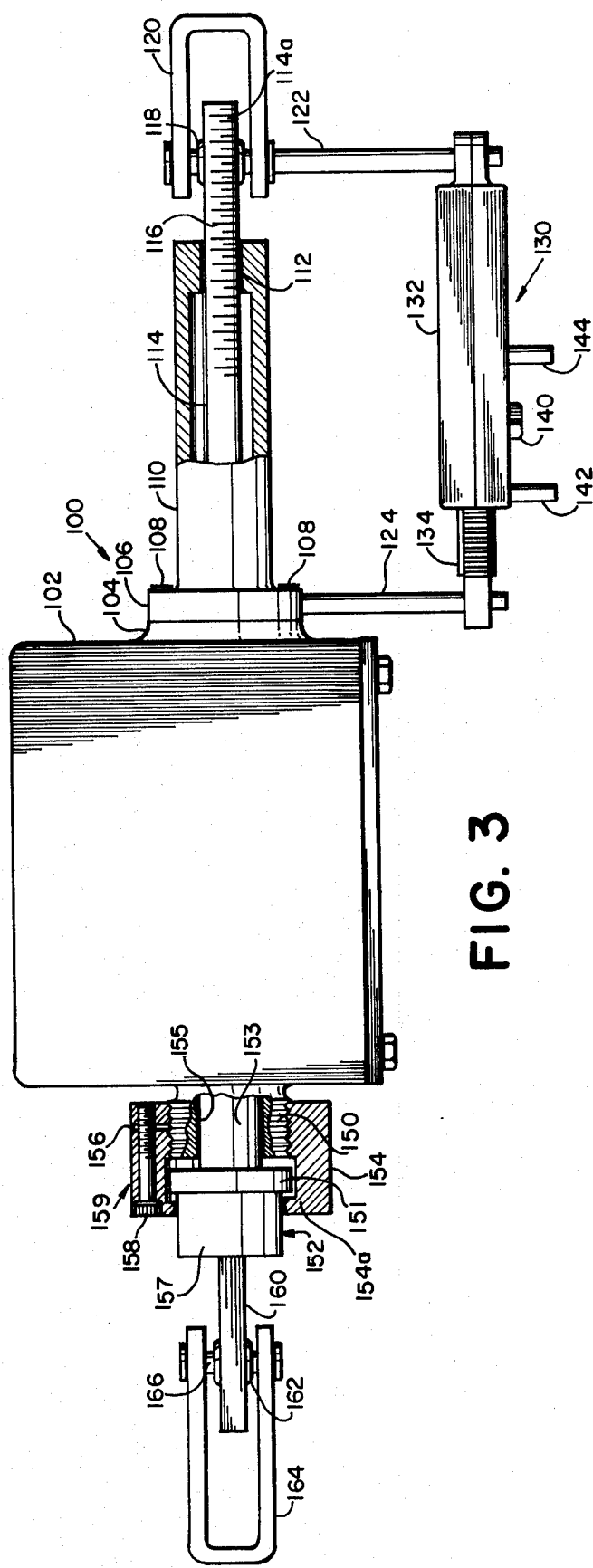
FIG. 3 illustrates a preferred form of the snubber and mode selective coupling.

FIG. 3 shows another embodiment of the test fixture according to the invention applied to a snubber of the type illustrated in FIGS. 6, 7 and 8 of my copending application Ser. No. 10,621, filed Feb. 9, 1979. Such snubbers employ, as their damping mechanism, a rack, a rack-driven escapement wheel and a pallet member having pallets which alternately engage and disengage the teeth of the escapement wheel, thus controlling the rotational speed and/or acceleration of the escapement wheel and, in turn, the relative movement of the two sections of the snubber.

As illustrated in FIG. 3, the snubber generally designated 100 comprises a first section, which includes a rectangular housing 102, containing the escapement wheel and pallet member of the type mentioned above, and a tubular extension 110 having an integral flange 106 which is secured by way of screws 108 to a boss 104 formed on housing 102. The snubber 100 has a second section which has rack member 114 that drives the above-mentioned escapement wheel in the first snubber section, the rack member 114 sliding telescopically into and out of the first section 102, 110 of snubber 100. Tubular extension 110, has an end opening 112 which serves, in part, as a guide for the rack 114. The exposed terminal end 114a of the rack may be provided with suitable attachment means, such as the self-aligning ball bushing 118, for attachment to external structure as by way of clevis 120. Rack 114 may be provided with gage marks 116 by means of which relative motion or movement between the telscoping sections of snubber 100 may be determined or measured.

Housing part 102 is also provided with a tubular, externally threaded extension 150 through the agency of which snubber section 102, 110 may be attached to other external structure by way of a mode selection means or coupling generally designated 159 which provides, selectively, the fixed coupling required during normal service of the snubber, and the loose coupling that affords the smoothly sliding, limited movement between the snubber section and its associated strut or terminal required during the in situ test procedure of the present invention. Tubular extension 150 is provided with an internal bore 155 large enough to slidably receive the reduced diameter, pilot portion 153 of a terminal means or stud shown generally at 152, the latter forming a part of a mode selection means generally designated 159. Stud 152 has integrally formed thereon a flange 151, the function of which is similar to that of flange 66 of FIG. 2. Stud 152 may include an outer end portion 157 formed beyond flange 151. Fixedly secured to end portion 157 may be a conventional snubber terminal end or tongue portion 160. The latter may be provided with a self-aligning ball bushing 162 for attachment to a clevis 164 by means of pin 166. The snubber illustrated in FIG. 3 is adapted for use in close-coupled systems, where the snubber assembly alone spans the space between the suspended pipe support wall.

Stud 152 is held to the threaded tubular extension 150 of snubber 100 by means of jam nut 154. In FIG. 3, jam nut 154 is shown in a less than fully tightened position on threaded extension 150 in order better to show the relation of the parts. In the normal operating condition of the snubber, the jam nut is tightened to ensure that flange 151 on stud 152 is fixedly or tightly held or clamped between the distal end of threaded extension 150 and the flange-retaining shoulder 154a formed by the reduced diameter end of jam nut 154. Lock means may be employed to ensure that jam nut 154 will not loosen during long periods of operation of the snubber, which may be subjected to vibration and other motion or forces. For example, the lock means may be provided by a slot 156 sawed or otherwise formed in or through a part of the wall of jam nut 154, and a socket head cap screw 158 provided for drawing toward each other the separated parts of the jam nut, thus effectively locking the jam nut on threaded extension 150.

The in situ test fixture, generally designated 130, which may be of the type described hereinafter with reference to FIG. 4, may be attached to the two sections 114 and 102, 110 of snubber 100 by means of adapters 122 and 124 respectively. The length of adapters 122 and 124 has been exaggerated in FIG. 3 for clarity of illustration. In practice, such adapters should be as short as possible, consistent with providing the necessary mechanical clearances and advantages. If desired, adapter 122 may be an integral extension or part of the pin that secures the exposed terminal end 114a of rack 114 to clevis 120. Adapter 124 may be secured to flange 106 of tubular extension 110. If the snubber is installed with adapters 122 and 124 in place, the technician's task of attaching test fixture 130 is further simplified. He need then merely attach the test fixture to the adapters 124 and 122. The test fixture 130 may comprise generally a main body portion 132, rack member 134, and drive nut 140 which may drive a pinion, (not shown in FIG. 3) contained within the body of the test fixture, the pinion acting to effect, selectively, extension or retraction of the rack 134. As previously described with reference to FIG. 2, drive nut 140 may be engaged by a suitable wrench, preferably a torque wrench, for the purpose of applying the test forces.

If desired, the extent of relative motion or movement effected between the two sections of the snubber under test may be determined by gage marks 116 provided on one section of the snubber, as on rack 114 in FIG. 3, or by gage marks (not shown) provided on rack 134 of test fixture 130. Alternatively, the test fixture 130 may be provided with test limit pins or stops 142, 144 which, by interference with the torque wrench handle serve to determine the limits of the arc through which the torque wrench may be moved and thus, in turn, the magnitude of movement effected in one snubber section relative to the other. The test procedure itself has already been described with reference to the embodiment of FIG. 2.

Figure 4:
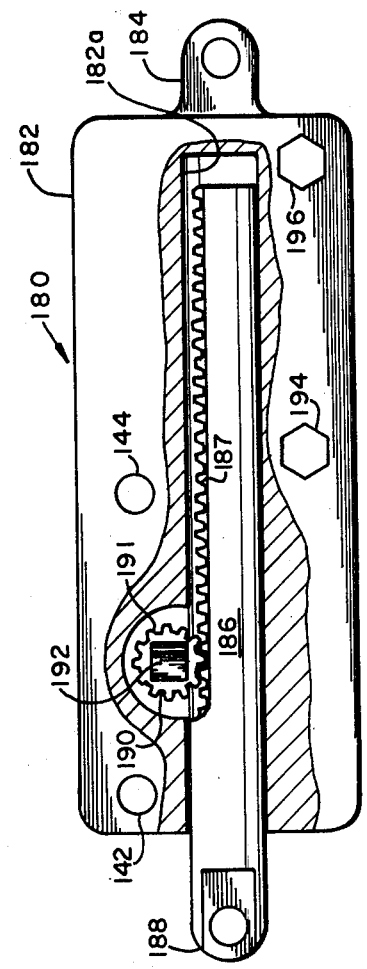
FIG. 4 shows, by way of example, a test fixture that may be employed in performance of the test procedure.

Referring now to FIG. 4, there is illustrated a test fixture or force conversion unit generally designated 180 that may be used in practicing the test procedure of the invention. The test fixture may comprise a main body portion 182 which has a longitudinal, generally centrally located cavity 182a opening at one end to receive a rack member 186. The rack member 186 is provided with rack teeth 187 and may have at its exposed end 188 an aperture usable for attaching the rack to an adapter (as previously described) secured to one section of the snubber, (see FIG. 3). The walls forming cavity 182a serve as guide means for ensuring smooth, telescoping movement of the rack 186 into and out of main body 182. Main body 182 is provided with an apertured lug 184 at its closed end for securing that end of the test fixture to an adapter, as previously mentioned.

Rack 186 is driven into and out of main body 182 by means of drive pinion 190 whose teeth 191 engage rack teeth 187. In turn, the drive pinion 190 is driven by drive nut 192 which may be engaged by a suitable ratchet-type socket or torque wrench, as described in regard to FIG. 2.

For ease of manufacture, the main body portion 182 of test fixture 180 may be formed in two mating parts, one of which is the mirror image of the other. In FIG. 4, the part nearest the viewer is shown with a portion broken away to reveal the longitudinal cavity 182a, rack 186, and pinion 190. The pinion 190 is, of course, suitably journaled in the two parts of the body portion 182. The two body parts of portion 182 may be secured together by any suitable means such as screws 194 and 196. The body parts may also be secured together by means of pins 142 and 144 (shown in and described with reference to FIG. 3.)

While a specific form of test fixture has been described in order to afford a complete understanding of the invention and its practice, it should be appreciated that the test fixture illustrated is but one means of conveniently applying a test force between the relatively movable sections of a snubber. Many other known or conventional type devices could be employed. Also, it may be sufficient for some purposes to merely determine whether the snubber sections move with respect to each other or whether the snubber sections are locked. It should be appreciated that a locked snubber may be discovered by merely loosening the coupling described above and simply applying an axial force to the snubber to simulate the forces anticipated on the snubber during its service life. The force may be applied, for example, to the strut 24, either manually or by utilizing any suitable tools or equipment. IF, as a result of the application of the axial force to the snubber 20, the technician visually observes that the two snubber sections 28 and 30 move relative to each other, the snubber is not locked and consequently can be presumed to be operational. If the technician observes some movement of the pipe 2 and no relative motion between the snubber sections 28 and 30, the snubber is locked. Although the invention itself, both in its method and apparatus aspects, has been described with particular reference to certain specific embodiments and test procedures, it will be understood that the invention may be embodied in a large variety of forms diverse from those specifically shown and described without departing from the scope and spirit of the invention as defined by the appended claims.

I claim:

1. In a method of testing a snubber in situ in a snubber system including a supporting structure, a structure supported by said supporting structure, and a snubber having relatively movable sections and being operatively coupled between said supporting structure and said supported structure; the steps comprising:
(a) loosening the coupling between said snubber and one of said structures to permit limited movement between the relatively movable sections of said snubber without inducing substantial movement of said supported structure;
(b) applying a test force within a predetermined high range to the snubber system for a period of time sufficient to cause relative motion of a predetermined magnitude between said relatively movable sections of said snubber; and
(c) comparing said period of time with a time standard established for said snubber.

2. In a method of testing a snubber in situ in a snubber system including a supporting structure, a structure supported by said supporting structure, and a snubber having relatively movable sections and being operatively coupled between said supporting structure and said supported structure; the steps comprising:
(a) loosening the coupling between said snubber and one of said structures to permit limited motion between the relatively movable sections of said snubber without inducing substantial movement of said supported structure;
(b) applying a test force within a predetermined low range of force between said relatively movable sections of said snubber to effect slow motion of one snubber section relative to the other so that the response of said snubber to forces induced by thermal expansion or contraction of one of said structures are simulated; and
(c) applying a test force within a predetermined high range of force between said relatively movable sections of said snubber so that the predetermined proper operation of said snubber may be determined.

3. The method of testing as claimed in claim 2, wherein said test forces are applied between said relatively movable sections of said snubber both in one direction to effect extension of said snubber, and in the opposite direction to effect contraction of said snubber.

4. In a method of testing a snubber in situ in a snubber system including a supporting structure, a structure supported by said supporting structure, and a snubber having relatively movable sections and being operatively coupled between said supporting structure and said supported structure; the steps comprising:
(a) loosening the coupling between said snubber and one of said structures to permit limited motion between the relatively movable sections of said snubber without inducing substantial movement of said supported structure;
(b) applying test forces between said relatively movable sections of said snubber to simulate forces on said snubber anticipated during the service life of said snubber, and to reveal the response of said snubber to the application of said forces; and
(c) following completion of step (b) hereof, tightening the coupling loosened in step (a) hereof.

5. The method of testing as claimed in claim 4, wherein the test forces are applied between said relatively movable sections of said snubber and include a force within a predetermined low range of forces to simulate forces on the snubber induced by thermal expansion or contraction of one of the structures to which said snubber is coupled, and also an abruptly-applied high force within a predetermined high range of forces to simulate shock forces that might be applied as a result of seismic shock or vibration.

6. In a snubber system adapted to be tested in situ comprising a supporting structure, a structure supported by said supporting structure, a snubber having two relatively movable sections, means coupling one of said snubber sections to said supporting structure, means coupling the other of said snubber sections to said supported structure, said snubber serving to damp the effects of movement of said supporting structure relative to said supported structure; the combination therewith of:
(a) means for loosening one of said coupling means to permit limited motion between said relatively movable snubber section without inducing substantial movement of said supported structure; and
(b) test means operatively engagable with the two snubber sections for applying a test force of a predetermined magnitude between said snubber sections to cause, selectively, a predetermined extension or contraction of said snubber for determining operation of said snubber.

7. The snubber system as claimed in claim 6, said system further comprising means for indicating displacement effected by said test force applied between said snubber sections.

8. The snubber system as claimed in claim 6, said test means having means for limiting to a predetermined value the displacement effected between said snubber sections by the application of said test force.

9. A snubber, capable of having its operating characteristics tested without removal from its operative position in a snubber system, said snubber having an operating axis and being adapted to be secured between first and second external structures in said system, comprising:
(a) first and second snubber sections movable one with respect to the other;
(b) first terminal means on said first snubber section for coupling said first snubber section to said first external structure;
(c) second terminal means on said second snubber section for coupling said second snubber section to said second external structure;
(d) mode selection means interposed between said second snubber section and said second terminal means for providing first and second selective modes of snubber operation, the first mode having the snubber coupled in fixed operative relationship between the first and second external structures and the second mode having the second snubber section movably coupled between the first snubber section and the second terminal means to permit limited movement between the snubber sections for testing snubber operation, the mode selection means comprising:

an externally threaded extension at the end portion of said second snubber section, said extension having an internal opening;

a member affixed to said second terminal means and slidably received in said internal opening, and said member having an increased diameter portion; and coupling means engagable with the increased diameter portion of said member and threadely engaged with the threaded extension of said snubber section, said coupling means being adjustable to the first mode for holding the member in fixed relationship to the extension of the second snubber section, and to the second mode to permit limited movement between said threaded extension and said member, for testing snubber operation.

10. The snubber claimed in claim 9, in which said mode selection means further includes locking means for ensuring the fixed relationship between the member and the extension during operation of the snubber.

11. A snubber, capable of having its operating characteristics tested without removal from its operative position in a snubber system, said snubber having an operating axis and being adapted to be secured between first and second external structures in said system, comprising:

(a) first and second snubber sections movable one with respect to the other;

(b) first terminal means on said first snubber section for coupling said first snubber section to said first external structure;

(c) second terminal means on said second snubber section for coupling said second snubber section to said second external structure;

(d) mode selection means interposed between said second snubber section and said second terminal means for providing first and second selective modes of snubber operation, the first mode having the snubber coupled in fixed operative relationship between the first and second external structures and the second mode having the second snubber section movably coupled between the first snubber section and the second terminal means to permit limited movement between the snubber sections for testing snubber operation; and (e) connection means attached to each of said snubber sections for securing thereto a test fixture, the test fixture being usable for applying test forces between said snubber sections to effect motion of one of said snubber sections relative to the other.

12. A test fixture for testing operation of a snubber in situ in a snubber system having a snubber with two relatively movable sections, said test fixture comprising two relatively movable parts, one of said parts being adapted to be coupled to one section of the snubber and the other of said parts being adapted to be coupled to the other section of said snubber, and means for effecting relative movement between said test fixture parts, said means being effective in response to a force to apply a force between the relatively movable sections of the snubber to which said test fixture is adapted to be coupled for determining snubber operation.

13. A test fixture for testing operation of a snubber in situ in a snubber system having a snubber with two relatively movable sections, said test fixture comprising:

(a) a body portion having longitudinal guide means;

(b) a rack member slidable relative to said body portion and retained in alignment therewith by said guide means;

(c) a pinion rotatably supported by said body portion and operatively engaged with said rack member;

(d) engaging means for engagement with a torque-exerting means for rotating said pinion to effect sliding movement of said rack member relative to said body portion of said test fixture;

(e) means on said body portion for securing said body portion to one section of the snubber; and (f) means on said rack member for securing said rack member to the other section of said snubber.

* * * * *